Patented Jan. 14, 1941

2,228,321

UNITED STATES PATENT OFFICE 2,228,321

AZO DYESTUFFS

Ernst Messmer, Leverkusen I. G. Werk, Rhine, Germany, assignor to General Aniline & Film Corporation, a corporation of Delaware No Drawing. Application February 25, 1938, Serial No. 192,566. In Germany March 4, 1937

5 Claims. (Cl. 260—178)

The present invention relates to new azo dyestuffs and to methods of preparing the same, more particularly it relates to azo dyestuffs which may be represented by the following general formula:

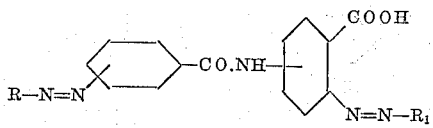

In this formula R stands for the radical of an aromatic o-hydroxy-carboxylic acid and $R_1$ stands for the radical of a coupling component which bears a hydroxy group in a position adjacent to the azo-group and which may contain azo-groups.

My new dyestuffs are obtainable by combining the tetrazo compounds prepared from aminobenzoylphenylendiamine - o - carboxylic acids of the constitution:

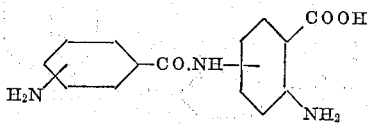

or their nuclear substitution products firstly with one molecular proportion of an o-hydroxycarboxylic acid capable of coupling, and then with one molecular proportion of an azo component coupling in a position adjacent to a hydroxy-group; in this way the first coupling component is attached at the side of the aminobenzoyl radical.

The same dyestuffs can in certain cases be obtained by diazotizing o-hydroxy-azo dyestuffs of the formula:

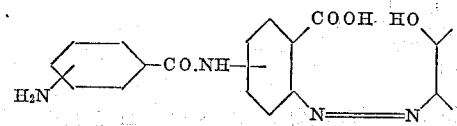

or their nuclear substitution products and by combining these diazo-compounds with an o-hydroxycarboxylic acid capable of coupling. They are prepared, for instance, by combining diazotized nitro- or acylamino-o-aminocarboxylic acids of the benzene series with an azo component coupling in a position adjacent to a hydroxy group, and, after reduction of the nitro group or saponification of the acylamino group, nitrobenzoylating, reducing the nitro group, diazotizing and combining with an o-hydroxycarboxylic acid capable of coupling, for instance, with salicylic acid, cresotinic acid, etc.

The dyestuffs thus obtainable are soluble in water and go on cellulose and regenerated cellulose, they yield, when aftertreated with agents which gave a metal, dyeings of very good fastness to light and washing.

Example 1

27.1 parts of 5-p-aminobenzoyl-2-phenylendiamine-carboxylic acid are diazotized with 13.8 parts of sodium nitrite with the addition of hydrochloric acid. The solution thus obtained is freed from any impurities by filtration; then the free mineral acid is neutralized with sodium carbonate while cooling with ice and the mixture is stirred with a neutral solution containing 15 parts of salicylic acid and 140 parts of a 20% sodium carbonate solution. After 3 to 4 hours the one-sided coupling is complete. A spot test on filter paper showns a brownish yellow precipitation with colourless outrun, which does not become coloured with an alkaline β-naphthol solution. Then a neutral solution prepared from 22.4 parts of 1-naphthol-4-sulphonic acid and 90 parts of a 20% sodium carbonate solution is added. The following day the dyestuff thus formed is filtered off. It corresponds in the free state to the following formula:

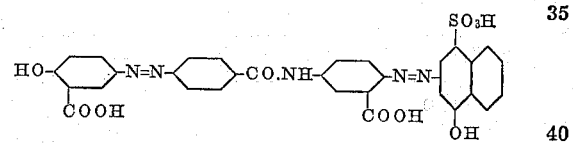

and dyes cotton bluish red; after-treatment with agents giving copper yields a copper-red dyeing of good fastness to washing and light.

The following table shows shades which can be obtained of the same initial coupling by replacing the 1-naphthol-4-sulphonic acid by other final components:

| Final component | Shade of dyeing on cotton | Shade of coppered dyeing |
|---|---|---|
| 1-phenyl-3-methyl-5-pyrazolone | Orange | Reddish-yellow. |
| p-Cresol | Yellowish-brown | Light reddish-brown. |
| 2-acetamino-5-naphthol-7-sulphonic acid | Bluish-red | Yellowish-Bordeaux. |
| 2-phenylamino-5-naphthol-7-sulphonic acid | Ruby | Garnet. |
| 2-phenylamino-8-naphthol-6-sulphonic acid | Dark brown | Yellowish dark brown. |
| Monoazo dyestuff: o-chloraniline, diazotized, coupled in an acid medium with 1-amino-8-naphthol-4-sulphonic acid. | Greenish-blue | Bluish green. |
| Monoazo dyestuff: 5-nitro-2-aminobenzoic acid, diazotized, coupled in an acid medium with 2-amino-5-naphthol-7-sulphonic acid. | Reddish violet | Dark grey. |
| 2-p-aminobenzoylamino-5-naphthol-7-sulphonic acid further diazotized and coupled with salicylic acid. | Bluish-red | Reddish-brown. |

Example 2

27.1 parts of 5-p-aminobenzoyl-2-phenylenediamine-carboxylic acid are diazotized and coupled with salicylic acid, according to the manner described in Example 1. Then a cold alkaline solution of 21.2 parts of acetoacet-o-chloranilide is added together with 90 parts of a 20 percent sodium carbonate solution. After some hours stirring the dyestuff formed is filtered off. It corresponds in its free state to the following formula:

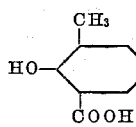
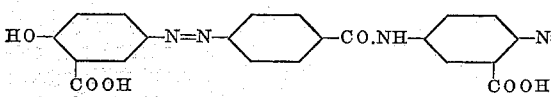

and dyes cotton light lemon-yellow shades, which, when after-coppered, become deeper and very fast to light and washing.

Example 3

The diazoazo compound, prepared in the same way as described in Example 1 is mixed with a neutral solution of 23.9 parts of 2-amino-8-naphthol-6-sulfonic acid and 90 parts of a 20% sodium carbonate solution. The isolated dyestuff corresponds in its free state to the following formula:

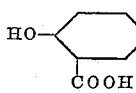
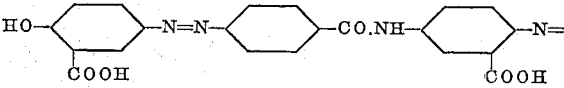

and dyes cotton dull violetish-brown shades; when aftertreated with copper a brown of good fastness to light and washing is obtained.

Example 4

18.2 parts of 5-nitro-2-aminobenzoic acid are diazotized and coupled with 22.4 parts of 1-naphthol-4-sulfonic acid. The dyestuff is reduced to the amino azo dyestuff in the usual manner with 42 parts of crystallized sodium sulphide. The latter is isolated and treated in a weakly alkaline solution at 60–70° C. with p-nitrobenzoylchloride. The separated condensation product is dissolved in hot water and reduced at 50–60° C. to the aminobenzoylaminoazo dyestuff with 42 parts of sodium sulphide. It is separated and purified by dissolving and precipitating. To the solution of this dyestuff 6.9 parts of sodium nitrite at about 25° C. and hydrochloric acid are added. After the nitrous acid has disappeared the diazo suspension is cooled to 0° C. and stirred with a solution prepared from 17 parts of o-cresotinic acid with 120 parts of a 20 percent sodium carbonate solution. The coupling product shows properties similar to those of the dyestuff obtained according to Example 1. In the free state it corresponds to the following formula:

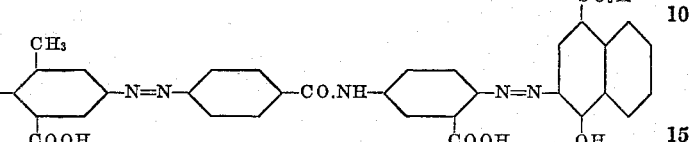

Example 5

27.1 parts of 4-p-aminobenzoyl-2-phenylendiaminecarboxylic acid are diazotized in the same way as the isomeric compound in Example 1, and one side is coupled with salicylic acid. After the first coupling is complete a neutral solution of 34.3 parts of 2-benzoylamino-5-naphthol-7-sulphonic acid and 45 parts of a 20 percent sodium carbonate solution are added. The dyestuff thus obtained corresponds in the free state to the following formula:

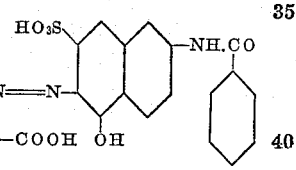

and dyes cotton reddish orange shades. By after-coppering the dyeing turns somewhat darker, while the fastness to washing and light are improved. If the final coupling is effected with 31.5 parts of 2-phenylamino-5-naphthol-7-sulphonic acid, a dyestuff is obtained which dyes cotton brownish-red and yields, when after-coppered, a yellowish red which is fast to washing and light.

I claim:
1. Azo dyestuffs of the general formula:

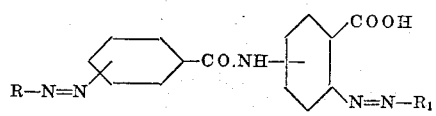

wherein R stands for the radical of an aromatic o-hydroxy-carboxylic acid of the benzene series and R₁ stands for the radical of a coupling component bearing a hydroxy group in a position adjacent to the azo-group, yielding on cellulosic fibres, when aftercoppered, dyeings of very good fastness to light and washing.

2. Azo dyestuffs of the general formula:

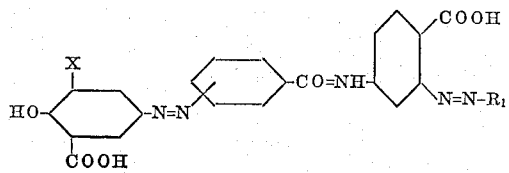

wherein $R_1$ stands for the radical of a coupling component bearing a hydroxy group in a position adjacent to the azo group and X means a substituent of the group consisting of hydrogen and alkyl yielding, when aftercoppered dyeings of very good fastness to light and washing.

3. The azo dyestuff which corresponds in its free state to the following formula:

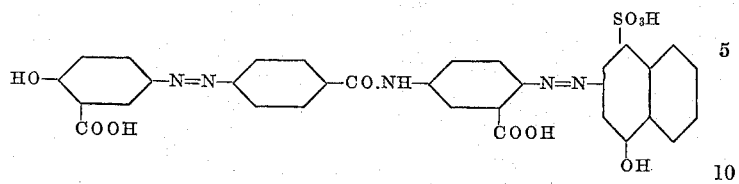

dyeing cotton bluish red shades and yielding, when after-coppered, copper-red shades of good fastness to light and washing.

4. The azo dyestuff which corresponds in its free state to the following formula:

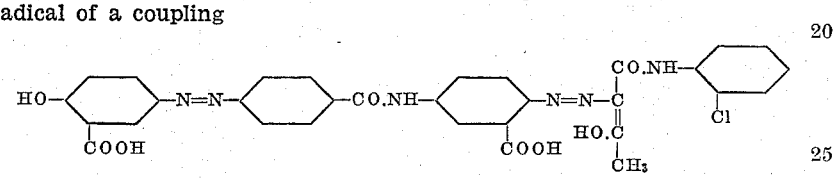

dyeing cotton lemon-yellow shades and yielding, when after-coppered, yellow shades of good fastness to light and washing.

5. The azo dyestuff which corresponds in its free state to the following formula:

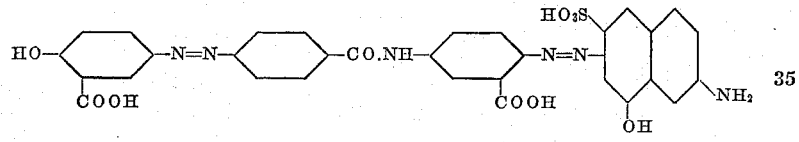

dyeing cotton dull violetish brown shades and yielding, when after-coppered, brown shades of good fastness to light and washing.

ERNST MESSMER.